(12) United States Patent
Hsiao et al.

(10) Patent No.: US 8,952,871 B2
(45) Date of Patent: Feb. 10, 2015

(54) 3D LCD PANEL, 3D LCD DEVICE AND DRIVING METHOD

(75) Inventors: Chiachiang Hsiao, Shenzhen (CN); Chihwen Chen, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 400 days.

(21) Appl. No.: 13/508,418

(22) PCT Filed: Apr. 24, 2012

(86) PCT No.: PCT/CN2012/074595
§ 371 (c)(1),
(2), (4) Date: May 7, 2012

(87) PCT Pub. No.: WO2013/143196
PCT Pub. Date: Oct. 3, 2013

(65) Prior Publication Data
US 2013/0257694 A1  Oct. 3, 2013

(30) Foreign Application Priority Data

Mar. 29, 2012 (CN) .......................... 2012 1 0087577

(51) Int. Cl.
*G09G 3/00* (2006.01)

(52) U.S. Cl.
USPC .......................................................... 345/32

(58) Field of Classification Search
CPC ........ H04N 13/04; G06T 15/00; G02B 27/26; G09G 3/00; G03B 21/00; G03B 21/14
See application file for complete search history.

(56) References Cited

U.S. PATENT DOCUMENTS

| 2008/0231952 A1 | 9/2008 | Kim |
| 2011/0222017 A1* | 9/2011 | Lin ............................... 349/201 |
| 2012/0320173 A1* | 12/2012 | Kim et al. ...................... 348/60 |

FOREIGN PATENT DOCUMENTS

| CN | 101571631 A | 11/2009 |
| CN | 102253526 A | 11/2011 |
| EP | 0656560 A2 | 6/1995 |
| JP | 2009069841 A | 4/2009 |

OTHER PUBLICATIONS

Li Qi, the International Searching Authority written comments, Jan. 2013, CN.

* cited by examiner

*Primary Examiner* — Tony N Ngo
(74) *Attorney, Agent, or Firm* — IPro, Inc.; Na Xu

(57) ABSTRACT

The invention provides a 3D LCD panel, a 3D LCD device, and a driving method. The 3D LCD panel includes a plurality of pixels; each pixel includes three subpixels which respectively correspond to different colors. A light emitting surface of the 3D LCD panel is crosswise provided with two different pattern retarders, and two adjacent subpixels corresponding to different colors in rows or columns are correspondingly provided with different pattern retarders. Each three adjacent subpixels covered by the same pattern retarder correspond to different colors to form one pixel. The mura width of the invention is only is only ⅓ width of the conventional mura, thereby improving the watching effect.

6 Claims, 4 Drawing Sheets

3D LCD PANEL, 3D LCD DEVICE AND DRIVING METHOD

TECHNICAL FIELD

The invention relates to the field of three-dimensional (3D) display, and more particularly to a 3D liquid crystal display (LCD) panel, a 3D LCD device, and a driving method.

BACKGROUND

Polarization 3D decomposes original images based on the principle that light has vibration direction. Two images with different polarization directions are conveyed to a watcher by adding a polarizer on the display screen. When the images are passing the polarization glasses, the left and right lens of the polarization glasses can only receive the image from one polarization direction. Thus, the left and right eyes of the watcher receive two different images, which are combined to form a 3D image in the brain.

As shown in FIG. 1, light forms linear polarized light after being emitted from a front polarizer (PF) 11 at the side of a LCD color film (CF) substrate, and then forms linear polarized light perpendicular to each other after passing through a $\lambda/2$ polaroid 12 and an isotropic layer. After passing through a $\lambda/4$ polaroid 13 with 45° included angles, the two linear polarized light form left circular polarized light and right circular polarized light. After passing $\lambda/4$ circular polarization lenses 14 of the glasses, the left circular polarized light and the right circular polarized light form liner polarized light which respectively reach the left eye and the right eye after passing through the polarizer of the 3D glasses 15.

FIG. 2 shows a design of a stripe pixel. One scan line corresponds to three data lines, which provide data signals to subpixels 300 R, G, and B, respectively. When matching with 3D pattern retarders, a left eye pattern retarder 410 for alignment is matched above the pixels 300 of even number, and only the left eye can see the signals of the pixels 300 of even number after the watcher wears the 3D glasses; and another right eye pattern retarder 420 for alignment is matched above the pixels 300 of odd number, and only the right eye can see the signals of the pixels 300 of odd number after the watcher wears the 3D glasses.

FIG. 3 shows a design of a tri-gate pixel. As shown in the Figure, three scan lines correspond to one data line, to respectively provide data signals to the subpixels 300 R, G, and B. When matching with 3D pattern retarders, one left eye pattern retarder 410 for alignment is matched above the pixels 300 of even number, and only the left eye can see the signals of the pixels 300 of even number after the watcher wears the 3D glasses; and another right eye pattern retarder 420 for alignment is matched above the pixels 300 of odd number, and only the right eye can see the signals of the pixels 300 of odd number after the watcher wears the 3D glasses.

The left eye cannot see the pixels 300 image which the right eye see, and the right eye cannot see the image which the left eye see simultaneously. The distance between two same pattern retarders is one pixel away, namely three subpixels, and the space distance is long. Thus, obvious mura is formed in the space, thereby affecting the display quality.

SUMMARY

In view of the above-described problems, the aim of the invention is to provide a 3D LCD panel, a 3D LCD device, and a driving method thereof capable of improving 3D display effect.

The aim of the invention is achieved by the following technical scheme.

A 3D LCD panel comprises a plurality of pixels; each pixel comprises three subpixels which respectively correspond to different colors; a light emitting surface of the 3D LCD panel is crosswise provided with two different pattern retarders, and adjacent subpixels corresponding to two different colors in rows or columns are correspondingly provided with different pattern retarders; every three adjacent subpixels covered by the same pattern retarder correspond to different colors, and form one pixel.

Preferably, the subpixels are vertically and horizontally arranged, the subpixels of each row correspond to the same color, the subpixels of each row correspond to the same pattern retarder, and the subpixels of two adjacent rows respectively correspond to different pattern retarders. This is a technical scheme of the LCD panel applied to the design of a stripe pixel, namely one scan line corresponds to three data lines.

Preferably, every six adjacent subpixels form one pixel group in accordance with the column arrangement. The first subpixel, the third subpixel, and the fifth subpixel from top to bottom of the pixel group form a first pixel, and the second subpixel, the fourth subpixel, and the sixth subpixel form a second pixel. This is a redefined pixel structure.

Preferably, each pixel comprises a first subpixel, a second subpixel, and a third subpixel which respectively correspond to the primary colors of red, green, and blue; the pattern retarder comprises a left eye pattern retarder for providing left eye watching images, and a right eye pattern retarder for providing right eye watching images; the first pixel corresponds to the left eye pattern retarder, and the second pixel corresponds to the right eye pattern retarder. This is a specific structure that three subpixels correspond to specific colors, and three subpixels correspond to pattern retarders.

Preferably, each pixel comprises a first subpixel, a second subpixel, and a third subpixel which respectively correspond to the primary colors of red, green, and blue; pattern retarder comprises a left eye pattern retarder for providing left eye watching images, and a right eye pattern retarder for providing right eye watching images; the first pixel corresponds to the right eye pattern retarder, and the second pixel corresponds to the left eye pattern retarder. This is another specific structure that three subpixels correspond to specific colors, and three subpixels correspond to pattern retarders.

Preferably, the subpixels are vertically and horizontally arranged, the subpixels of each column correspond to the same color, the subpixels of each column correspond to the same pattern retarder, and the subpixels of two adjacent columns respectively correspond to different pattern retarders. This is a technical scheme of a LCD panel applied to the design of a tri-gate pixel, namely one scan line corresponds to three data lines.

Preferably, every six adjacent subpixels form one pixel group in accordance with the row arrangement. The first subpixel, the third subpixel, and the fifth subpixel from top to bottom of the pixel group form a first pixel, and the second subpixel, the fourth subpixel, and the sixth subpixel form a second pixel. Each pixel comprises a first subpixel, a second subpixel, and a third subpixel which respectively correspond to the primary colors of red, green, and blue; the pattern retarder comprises a left eye pattern retarder for providing left eye watching images, and a right eye pattern retarder for providing right eye watching images; the first pixel corresponds to the left eye pattern retarder, and the second pixel corresponds to the right eye pattern retarder. This is a redefined pixel structure, in which three subpixels of each pixel correspond to specific colors, and three subpixels correspond to specific pattern retarders.

Preferably, every six adjacent subpixels form one pixel group in accordance with the row arrangement. The first subpixel, the third subpixel, and the fifth subpixel from top to bottom of the pixel group form a first pixel, and the second subpixel, the fourth subpixel, and the sixth subpixel form a second pixel; each pixel comprises a first subpixel, a second subpixel, and a third subpixel which respectively correspond to the primary colors of red, green, and blue; the pattern retarder comprises a left eye pattern retarder for providing left eye watching images, and a right eye pattern retarder for providing right eye watching images; the first pixel corresponds to the right eye pattern retarder, and the second pixel corresponds to the left eye pattern retarder. This is a redefined pixel structure, in which three subpixels of each pixel correspond to specific colors, and three subpixels correspond to specific pattern retarders.

A 3D LCD device comprises the 3D LCD panel mentioned above.

A method for driving the 3D LCD panel comprises the following steps:

A: Defining every three adjacent subpixels which are covered with the same pattern retarder and respectively correspond to different colors as one pixel, and B: Outputting display signals in accordance with the pixel defined in step A to drive.

In the invention, because each subpixel corresponds to one pattern retarder, and two adjacent subpixels correspond to different pattern retarders, the left and right eyes see different images at the same time, thereby guaranteeing the 3D display effect. Because the distance between two same pattern retarders is the width of one subpixel, correspondingly, the mura generated between the images seen by the same glasses is only the width of one subpixel, and the width of mura is only ⅓ width of the conventional mura, thereby improving the watching effect.

Legends: 11. front polarizer; 12. λ/2 polaroid; 13. λ/4 polaroid; 14. λ/4 circular polarization lens; 15. 3D glasses; 100. scan line; 200. data line; 300. pixel; 310. first subpixel; 320. second subpixel; 330. third subpixel; 410. left eye pattern retarder; 420. right eye pattern retarder; 500. pixel group; 510. first pixel; 520. second pixel.

DETAILED DESCRIPTION

The invention will further be described in detail in accordance with the figures and the preferable examples.

A 3D LCD device comprises a 3D LCD panel; the 3D LCD panel comprises a plurality of pixels; each pixel comprises three subpixels which respectively correspond to different colors; two adjacent subpixels corresponding to different colors are correspondingly provided with different pattern retarders; and every three adjacent subpixels covered by the same pattern retarder form one pixel.

EXAMPLE 1

Figure 1:
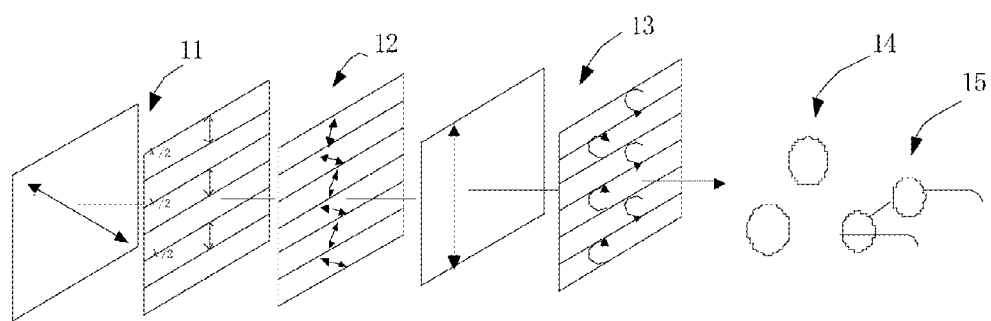
FIG. 1 is a schematic diagram of a 3D LCD device.
Figure 2:
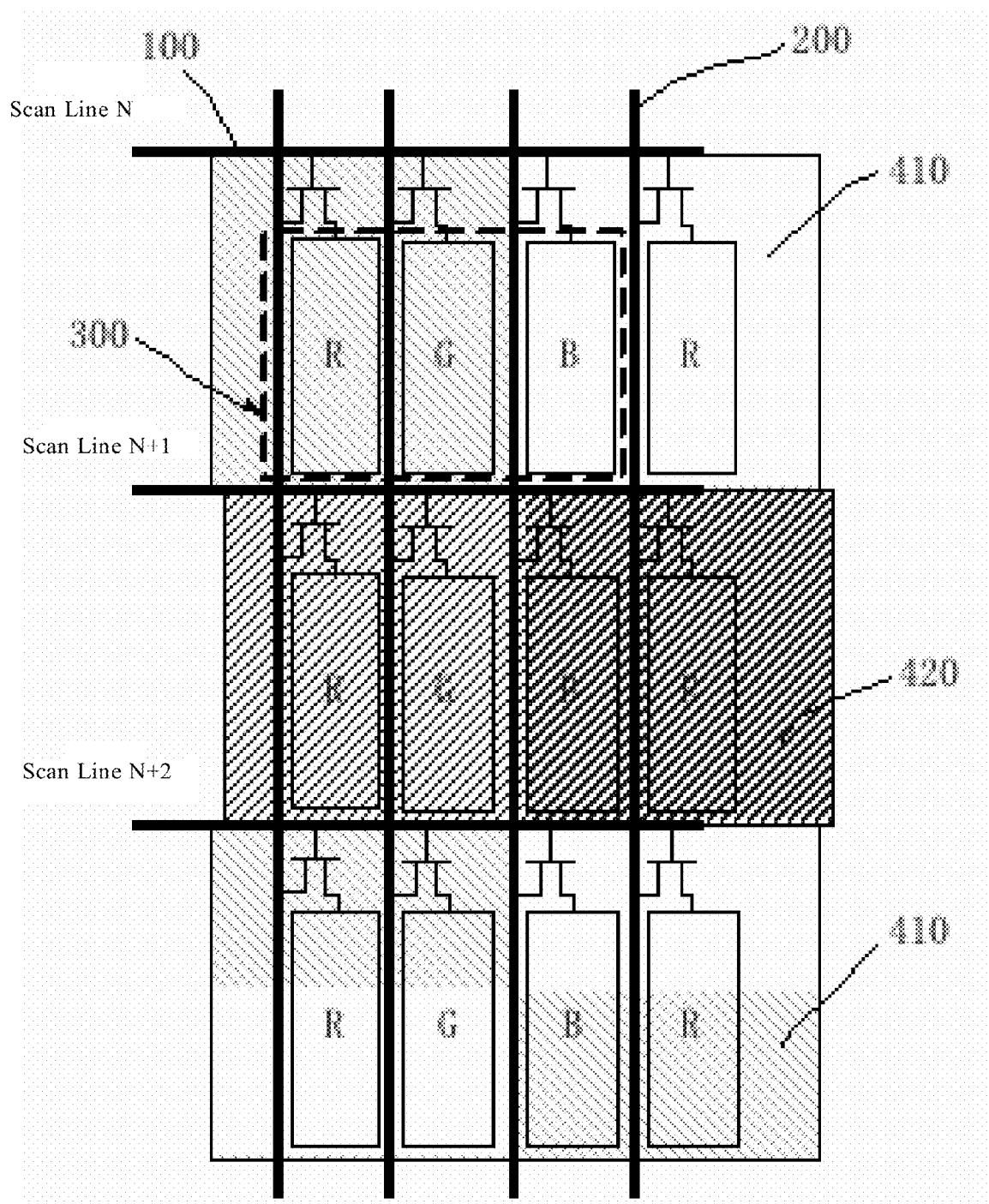
FIG. 2 is a design diagram of a conventional stripe pixel.
Figure 3:
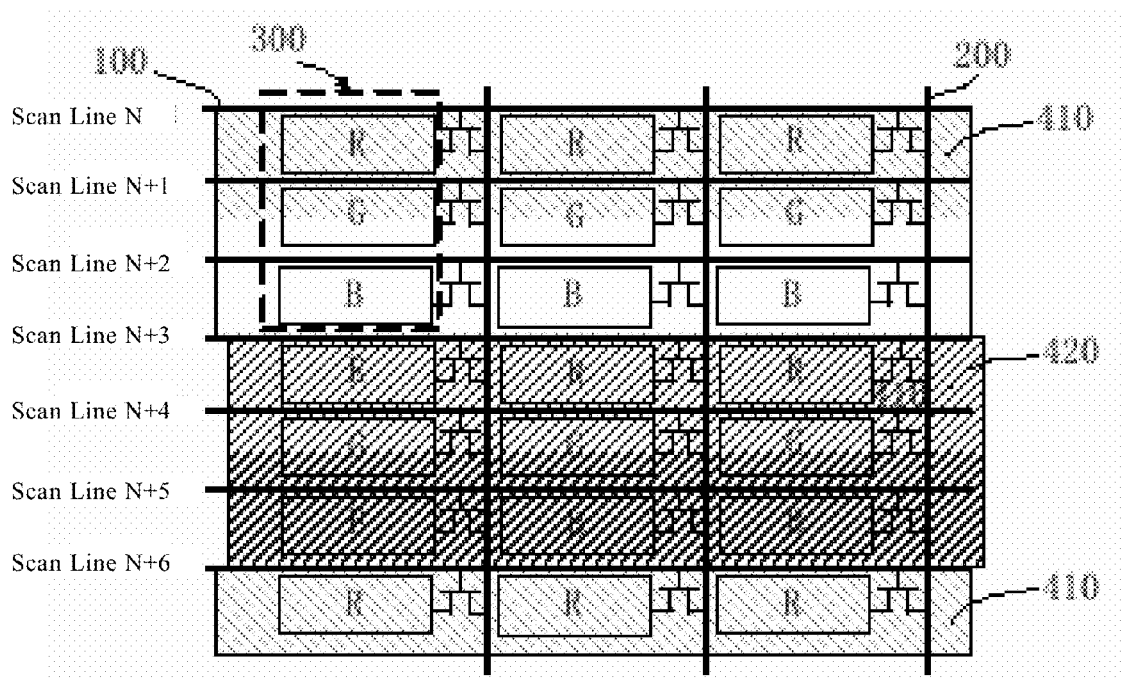
FIG. 3 is a design diagram of a conventional tri-gate pixel.
Figure 4:
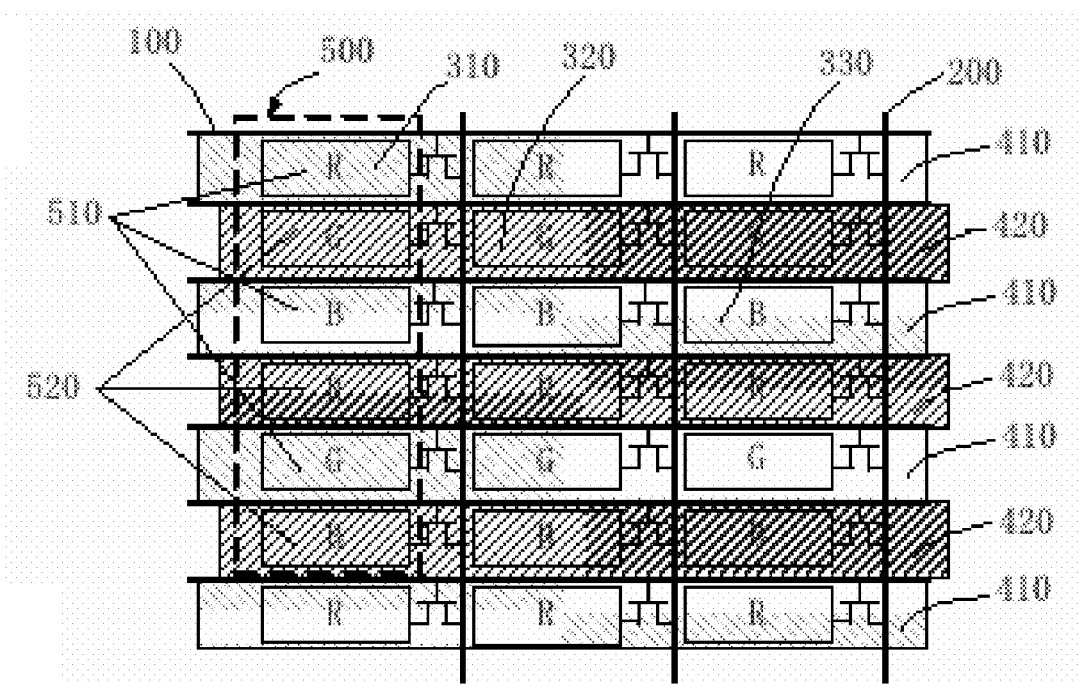
FIG. 4 is a design diagram of a pixel of a first example of the invention.

FIG. 4 shows a design of a stripe pixel. The 3D LCD panel comprises scan lines 100 which are horizontally arranged, and data lines 200 which are vertically arranged. The scan lines and the data lines form rectangle units arranged in matrix. Each rectangle unit corresponds to one subpixel. The subpixels of each row correspond to the same color, and the subpixels of each row correspond to the same pattern retarder correspondingly.

Specifically, every six adjacent subpixels form one pixel group 500 in the data line direction in accordance with the column arrangement. The first subpixel, the third subpixel, and the fifth subpixel from top to bottom of the pixel group 500 form a first pixel 510, and the second subpixel, the fourth subpixel, and the sixth subpixel form a second pixel 520. Each pixel comprise a first subpixel 310, a second subpixel 320, and a third subpixel 330 which respectively correspond to the primary colors of red, green, and blue; the pattern retarder comprises a left eye pattern retarder 410 for providing left eye watching images, and a right eye pattern retarder 420 for providing right eye watching images. The first pixel corresponds to the left eye pattern retarder, and the second pixel corresponds to the right eye pattern retarder. Optionally, the first pixel can correspond to the right eye pattern retarder, and the second pixel can correspond to the left eye pattern retarder.

A method for driving the 3D LCD panel comprises the following steps:

A: Defining every three adjacent subpixels which are covered with the same pattern retarder and respectively correspond to different colors as one pixel, namely the subpixels of each pixel are not close together because a subpixel of another pixel is arranged between two subpixels of the pixel.

B: Outputting display signals in accordance with the pixel defined in step A. The scan lines are driven by a conventional method, but the data lines are driven by a different method. The display data should be provided in accordance with the redefined pixel structure.

In the invention, the original pixels are redefined. The red and blue subpixels of the new first pixel 510 and the green subpixel of the second pixel 520 are matched with the left eye pattern retarder; and the red and blue subpixels of the second pixel 520 and the green subpixel of the first pixel 510 are matched with the left eye pattern retarder. The red and blue subpixels of the first pixel 510 and the green subpixel of the second pixel 520 display the data of one eye; and the red and blue subpixels of the second pixel 520 and the green subpixel of the first pixel 510 display the data of the other eye. Thus, the space distribution of the original pixels is improved, thereby displaying the images of the same eye by one subpixel instead of the original three subpixels, and improving the display quality.

EXAMPLE 2

Figure 5:
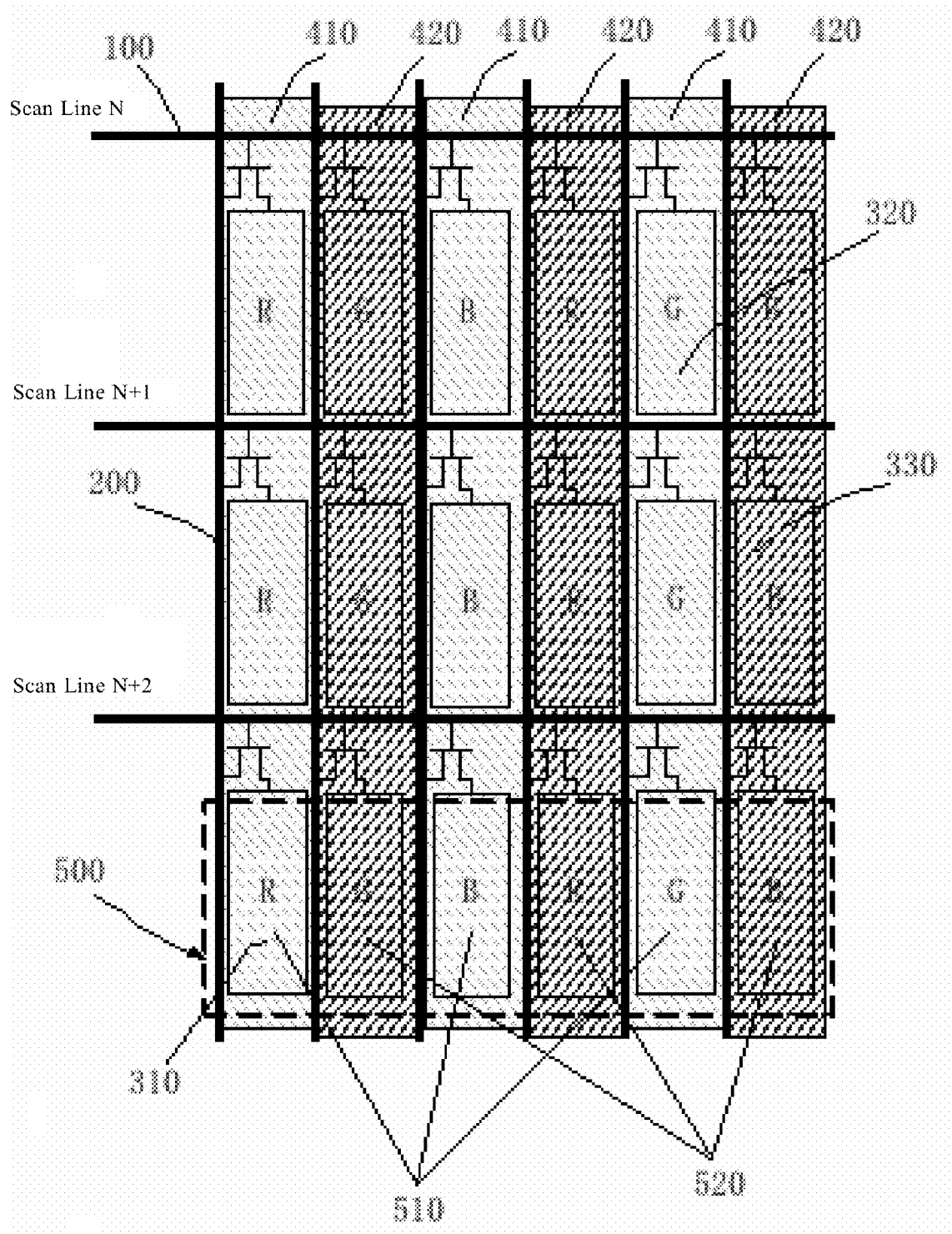
FIG. 5 is a design diagram of a pixel of a second example of the invention.

FIG. 5 shows a design of a tri-gate pixel. The 3D LCD panel comprises scan lines 100 which are horizontally arranged, and data lines 200 which are vertically arranged. The scan lines and the data lines form rectangle units arranged in matrix; each rectangle unit corresponds to one subpixel, the subpixels of each column correspond to the same color, and the subpixels of each column correspond to the same pattern retarder correspondingly.

Specifically, every six adjacent subpixels form one pixel group 500 in the scan line direction in accordance with the row arrangement. The first subpixel, the third subpixel, and the fifth subpixel from left to right of the pixel group form a first pixel 510, and the second subpixel, the fourth subpixel, and the sixth subpixel form a second pixel 520. Each pixel comprises a first subpixel 310, a second subpixel 320, and a third subpixel 330 which respectively correspond to the primary colors of red, green, and blue; the pattern retarder comprises a left eye pattern retarder 410 for providing left eye watching images, and a right eye pattern retarder 420 for providing right eye watching images; the first pixel corresponds to the left eye pattern retarder, and the second pixel corresponds to the right eye pattern retarder. Optionally, the first pixel can correspond to the right eye pattern retarder, and the second pixel can correspond to the left eye pattern retarder.

A method for driving the 3D LCD panel comprises the following steps:

A: Defining every three adjacent subpixels which are covered with the same pattern retarder and respectively correspond to different colors as one pixel, namely the subpixels of each pixel are not close together because a subpixel of another pixel is arranged between two subpixels of the pixel.

B: Outputting display signals in accordance with the pixel defined in step A. The scan lines are driven by a conventional method, but the data lines are driven by a different method. The display data should be provided in accordance with the redefined pixel structure.

In the invention, the original pixels are redefined. The red and blue subpixels of the new first pixel 510 and the green subpixel of the second pixel 520 are matched with the left eye pattern retarder; and the red and blue subpixels of the second pixel 520 and the green subpixel of the first pixel 510 are matched with the left eye pattern retarder. The red and blue subpixels of the first pixel 510 and the green subpixel of the second pixel 520 display the data of one eye; and the red and blue subpixels of the second pixel 520 and the green subpixel of the first pixel 510 display the data of the other eye. Thus, the space distribution of the original pixels is improved, thereby displaying the images of the same eye by one subpixel instead of the original three subpixels, and improving the display quality.

The invention is described in detail in accordance with the above contents with the specific preferred examples. However, this invention is not limited to the specific examples. The invention only changes the arrangement of the pattern retarders and redefines the pixel structure during 3D display, but does not change the arrangement of the corresponding color filters. Thus, no change is made to the driving method during 2D display, thereby simplifying the design, and facilitating the switching between 3D and 2D. For the ordinary technical personnel of the technical field of the invention, on the premise of keeping the conception of the invention, the technical personnel can also make simple deductions or replacements, and all of which should be considered to belong to the protection scope of the invention.

We claim:

1. A 3D LCD panel, comprising: a plurality of pixels; wherein each said pixel comprises three subpixels, each of which corresponds to different colors; a light emitting surface of said 3D LCD panel is crosswise provided with two different pattern retarders, and two adjacent subpixels corresponding to different colors in columns are correspondingly provided with different pattern retarders; and every three adjacent subpixels covered by the same pattern retarder correspond to different colors to form one pixel, and every six adjacent subpixels form one pixel group in accordance with the row arrangement; the first subpixel, the third subpixel, and the fifth subpixel from left to right of said pixel group form a first pixel, and the second subpixel, the fourth subpixel, and the sixth subpixel form a second pixel.

2. The 3D LCD panel of claim 1, wherein each said pixel comprises a first subpixel, a second subpixel, and a third subpixel which respectively correspond to the primary colors of red, green, and blue; said pattern retarder comprises a left eye pattern retarder for providing left eye watching images, and a right eye pattern retarder for providing right eye watching images; said first pixel corresponds to said left eye pattern retarder, and said second pixel corresponds to said right eye pattern retarder.

3. The 3D LCD panel of claim 1, wherein each said pixel comprises a first subpixel, a second subpixel, and a third subpixel which respectively correspond to the primary colors of red, green, and blue; said pattern retarder comprises a left eye pattern retarder for providing left eye watching images, and a right eye pattern retarder for providing right eye watching images; said first pixel corresponds to said right eye pattern retarder, and said second pixel corresponds to said left eye pattern retarder.

4. A 3D LCD device, comprising: a 3D LCD panel; wherein said 3D LCD panel comprises a plurality of pixels; each pixel comprises three subpixels, each of which corresponds to different colors; a light emitting surface of said 3D LCD panel is crosswise provided with two different pattern retarders, and two adjacent subpixels corresponding to different colors in rows or columns are correspondingly provided with different pattern retarders; every three adjacent subpixels covered by the same pattern retarder correspond to different colors to form one pixel, and every six adjacent subpixels form one pixel group in accordance with the row arrangement; the first subpixel, the third subpixel, and the fifth subpixel from left to right of said pixel group form a first pixel, and the second subpixel, the fourth subpixel, and the sixth subpixel form a second pixel.

5. The 3D LCD device of claim 4, wherein each said pixel comprises a first subpixel, a second subpixel, and a third subpixel which respectively correspond to the primary colors of red, green, and blue; said pattern retarder comprises a left eye pattern retarder for providing left eye watching images, and a right eye pattern retarder for providing right eye watching images; said first pixel corresponds to said left eye pattern retarder, and said second pixel corresponds to said right eye pattern retarder.

6. The 3D LCD device of claim 4, wherein said each pixel comprises a first subpixel, a second subpixel, and a third subpixel which respectively correspond to the primary colors of red, green, and blue; said pattern retarder comprises a left eye pattern retarder for providing left eye watching images, and a right eye pattern retarder for providing right eye watching images; said first pixel corresponds to said right eye pattern retarder, and said second pixel corresponds to said left eye pattern retarder.

* * * * *